J. W. KERR.
QUICKLY ADJUSTABLE STIRRUP LEATHER.
APPLICATION FILED JUNE 6, 1914.
Reissued July 21, 1914. 13,778.
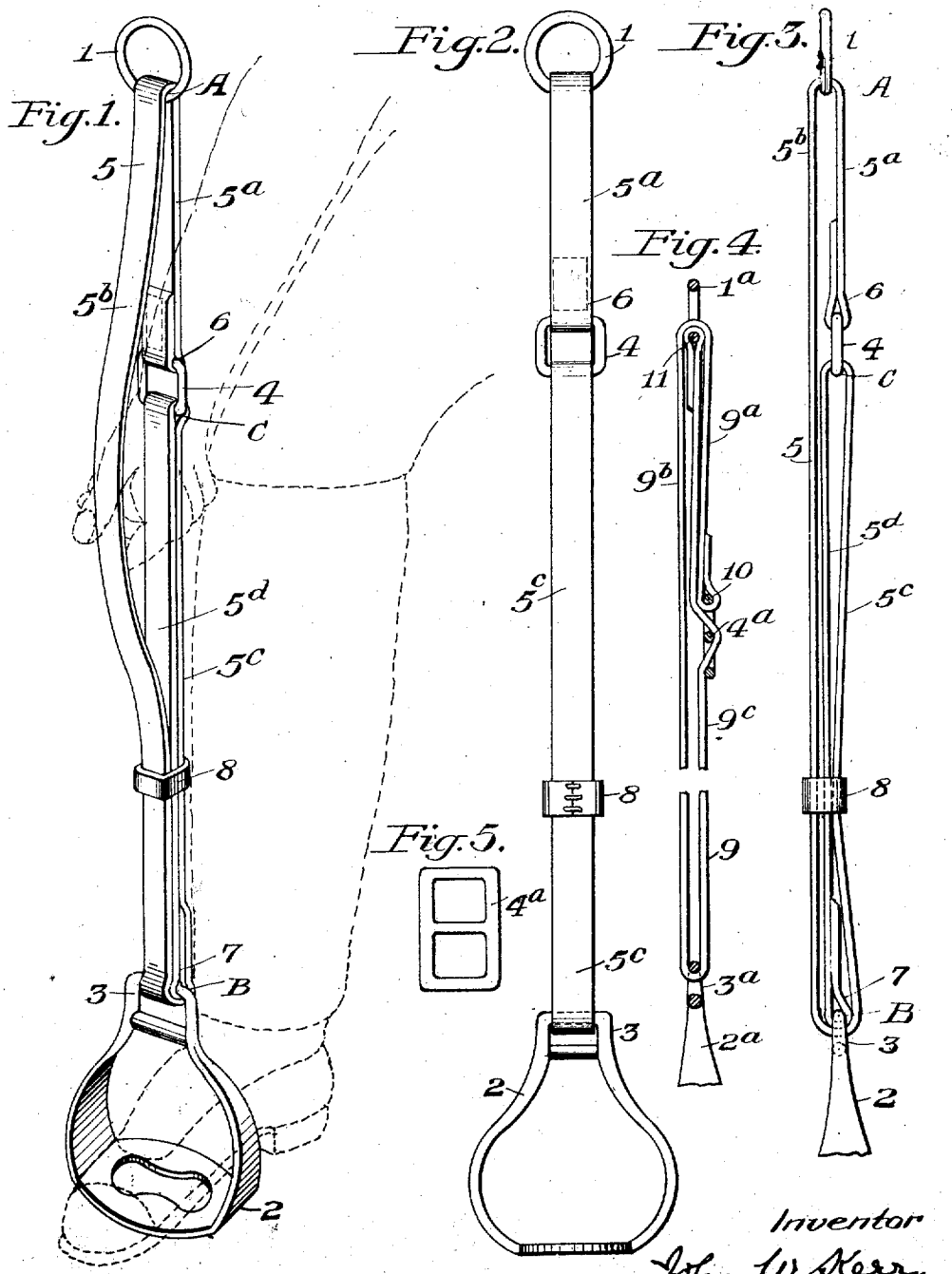
Witnesses
T. B. Humphries.
Oliver L. Badger
Inventor
John W. Kerr.
By J. M. Cooke
Attorney.

UNITED STATES PATENT OFFICE.

JOHN W. KERR, OF ORLANDO, FLORIDA, ASSIGNOR TO KERR ADJUSTABLE STRAP CO., INC.

QUICKLY-ADJUSTABLE STIRRUP-LEATHER.

13,778. Specification of Reissued Letters Patent. Reissued July 21, 1914.

Original No. 1,072,958, dated September 9, 1913, Serial No. 783,365. Application for reissue filed June 6, 1914. Serial No. 843,576.

*To all whom it may concern:*

Be it known that I, JOHN W. KERR, citizen of the United States, residing at Orlando, in the county of Orange and State of Florida, have invented certain new and useful Improvements in Quickly-Adjustable Stirrup-Leathers, of which the following is a specification.

The present invention relates in general to harness, and more particularly to a quickly adjustable buckleless leather or strap connection for stirrups and the like, the object of the invention being to provide a strap connection of this character which embodies novel features of construction whereby the necessity of using a buckle and weakening the strap by a number of openings therein is entirely eliminated and tension is utilized to lock the strap in an adjustable position, the strap connection being susceptible of being instantly lengthened or shortened as required.

A further object of the invention is to provide a strap connection of this character which is simple and inexpensive in its construction, which will positively hold an adjustment under the most trying conditions of use, and which will withstand hard usage without danger of breaking or becoming unduly worn.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a stirrup leather constructed in accordance with the invention, showing the manner of grasping the same to lengthen or shorten the leather. Fig. 2 is a front elevation of the stirrup leather. Fig. 3 is a side elevation of the stirrup leather. Fig. 4 is a side elevation of a stirrup leather showing an arrangement wherein the strap is locked in position by means of friction in contradistinction to one locked by tension, portions being broken away, and Fig. 5 is a detail view of the friction member employed in Fig. 4.

Corresponding and like parts are referred to in the following description and indicated in all the views of the drawing by the same reference characters.

For convenience in illustrating the invention it has been shown as embodied in a stirrup leather, although it will be understood that the invention is not restricted to stirrup leathers, but may be utilized in connection with check reins, traces, backbands, girths, or wherever a quickly adjustable strap connection of this character would be desirable.

Referring to the drawing, the numeral 1 designates the supporting ring or eye at the upper end of the stirrup leather, 2 the stirrup proper which is of the conventional construction and is formed with the stirrup eye 3, and 4 the connecting link. The strap 5 is threaded through the supporting ring or eye 1, the stirrup eye 3, and the connecting link 4, one end of the strap being secured to one of the end eyes, while the other end of the strap is secured to the connecting link 4. In the present instance, the upper end of the strap 5 is secured at 6 to the connecting link 4. From this point the strap is extended upwardly at $5^a$, threaded through the supporting ring or eye 1 and carried downwardly at $5^b$, threaded through the stirrup eye 3, and carried upwardly at $5^c$, threaded through the connecting link 4 and carried downwardly at $5^d$, the opposite end of the strap being secured at 7 to the stirrup eye 3.

With the foregoing construction it will be seen that there are three thicknesses of leather between the connecting link 4 and the stirrup eye 3, and two thicknesses of leather between the connecting link 4 and the supporting ring 1. A suitable retaining band or keeper 8 of leather or other suitable material surrounds the three thicknesses of leather between the connecting link 4 and the stirrup 2 so as to hold the same together. With this manner of looping the strap, a tension point is produced at A where the strap passes through the supporting eye 1, a second tension point at B where the strap passes through the stirrup eye 3, and such strap is securely held at C where it passes through the connecting link 4. At the tension point B, it will be observed that the looped portion of the strap which is threaded through the stirrup eye 3 passes around the end 7 of the strap which is connected to the stirrup eye, thereby permitting all of the three layers of the strap to lie in alinement, and producing a very effective lock at this point upon placing the device under tension. The two points of tension produce a positive lock which causes the strap to hold an adjustment, regardless of the amount of pressure which is applied to the stirrup or the tension to which the strap is subjected. However, by grasping the portion $5^b$ of the strap, as indicated by dotted lines upon Fig. 1, the length of the stirrup leather may be instantly increased or decreased as found desirable. By pulling downwardly upon the portion $5^b$ of the strap and moving the connecting link 4 toward the supporting ring 1 so as to increase the portion of the strap connection having three thicknesses, the length of the strap is shortened, while by pulling upwardly upon the portion $5^b$ of the strap and moving the connecting link 4 toward the stirrup so as to decrease the portion of the stirrup leather having three thicknesses, the length of the stirrup leather is increased. This adjustment can be made instantly and the adjustment will be positively retained by the stirrup leather by the tension under which the same may be placed. There is no necessity for providing a buckle and weakening the strap by a series of openings therein, and neither are there any free strap ends to project outwardly and cause annoyance.

A frictionally controlled strap in contradistinction to a tension controlled strap is shown by Figs. 4 and 5, in which $1^a$ designates the supporting ring, $2^a$ the stirrup, and $3^a$ the stirrup eye. The friction ring $4^a$ is shown as embodying a number of cross bars through which the strap may be threaded. The strap 9 has one end thereof secured at 10 to the friction ring $4^a$, is carried upwardly at $9^a$, threaded through the supporting ring $1^a$ and carried downwardly at $9^b$, threaded through the stirrup eye $3^a$ and carried upwardly at $9^c$, the end thereof being secured at 11 to the supporting eye $1^a$, while an intermediate part of the portion $9^c$ is threaded through the cross bars of the friction ring $4^a$. By releasing the tension in the strap so as to loosen the friction grip of the strap upon the ring $4^a$, the said ring $4^a$ can be raised and lowered upon the portion $9^c$ of the strap so as to increase or decrease the length of the stirrup leather.

While I have illustrated and described both a tension and a friction controlled strap, it will be understood that there are numerous other possible manners of constructing the looped strap connection and that many minor changes can be made in the construction of my improved tension controlled strap without departing in any manner from the spirit of the invention.

Having thus described the invention, what I claim as new and desire to secure by Letters Patent, is:—

1. A connecting member comprising a continuous length of flexible material having a connecting link to which one end of said material is connected, said material thence passing from said link to a point and bent to form a loop, thence extended in a reverse direction, beyond said link and bent to form another loop, thence extended to said link and passed through the same, and the end thence extended to a point within said last named loop and means for holding said end in sliding engagement with said last named loop.

2. A connecting member comprising a continuous length of flexible material having a connecting link to which one end of said material is connected, said material thence passing from said link to a point and bent to form a loop, thence extended in a reverse direction beyond said link and bent to form another loop, thence extended to said link and passed through the same from the outside, and the end thence extended to a point within said last named loop, and lying in alinement with the two sides thereof and means for holding said end in sliding engagement with said last named loop.

3. A quickly adjustable buckleless leather for stirrups and the like, including end attaching members, an intermediate connecting link, and a flat strap, one end of the strap being secured to the connecting link and the strap being then carried toward one of the end attaching members and threaded through the same, carried to the opposite end attaching member and threaded through the same, carried to the connecting link and threaded through the same, and then carried to the second mentioned end attaching member and secured thereto in slidable relation to the strap passing through the same.

4. A quickly adjustable buckleless leather for stirrups and the like including end attaching eyes, a connecting link, a looped strap having one end thereof secured to the connecting link, the said strap being then carried to one of the end attaching eyes, threaded through the same and carried to the opposite end attaching eye, threaded through the second end attaching eye and carried to the connecting link, threaded through the connecting link and carried to the second end attaching eye to which it is secured, whereby two thicknesses of strap are provided between the connecting link and the first end attaching eye, and three thicknesses of strap between the connecting link and second end attaching eye, and a keeper surrounding the looped strap to hold the different thicknesses thereof together.

In testimony whereof I have affixed my signature in the presence of two witnesses, this third day of June 1914.

JOHN W. KERR.

Witnesses:

HERMAN E. PINKERT,
MAHLON C. MARTIN.